Nov. 7, 1961  R. D. RUMSEY  3,007,551
ENERGY ABSORBING DEVICE
Filed March 17, 1958  3 Sheets-Sheet 1
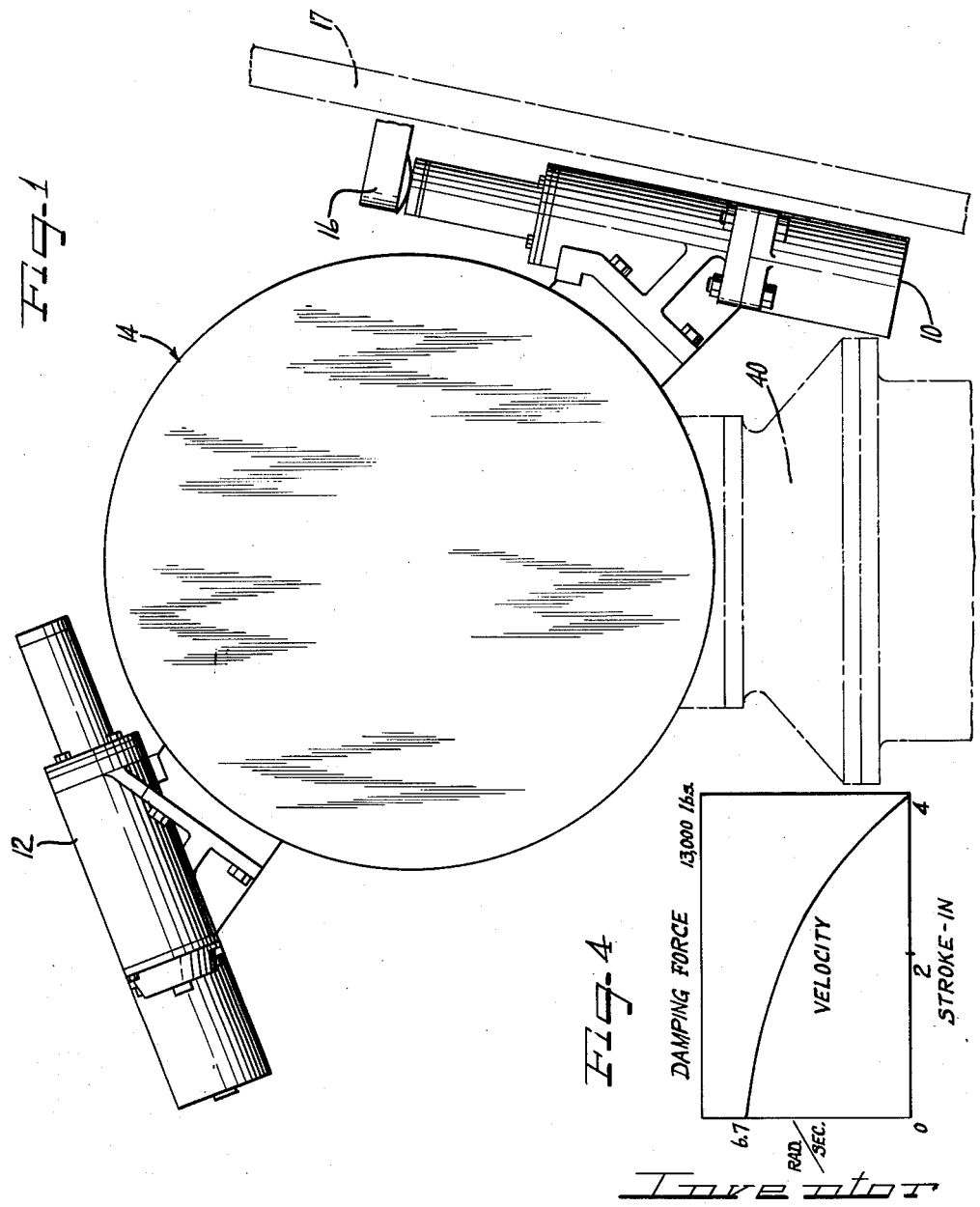
Inventor
Rollin Douglas Rumsey

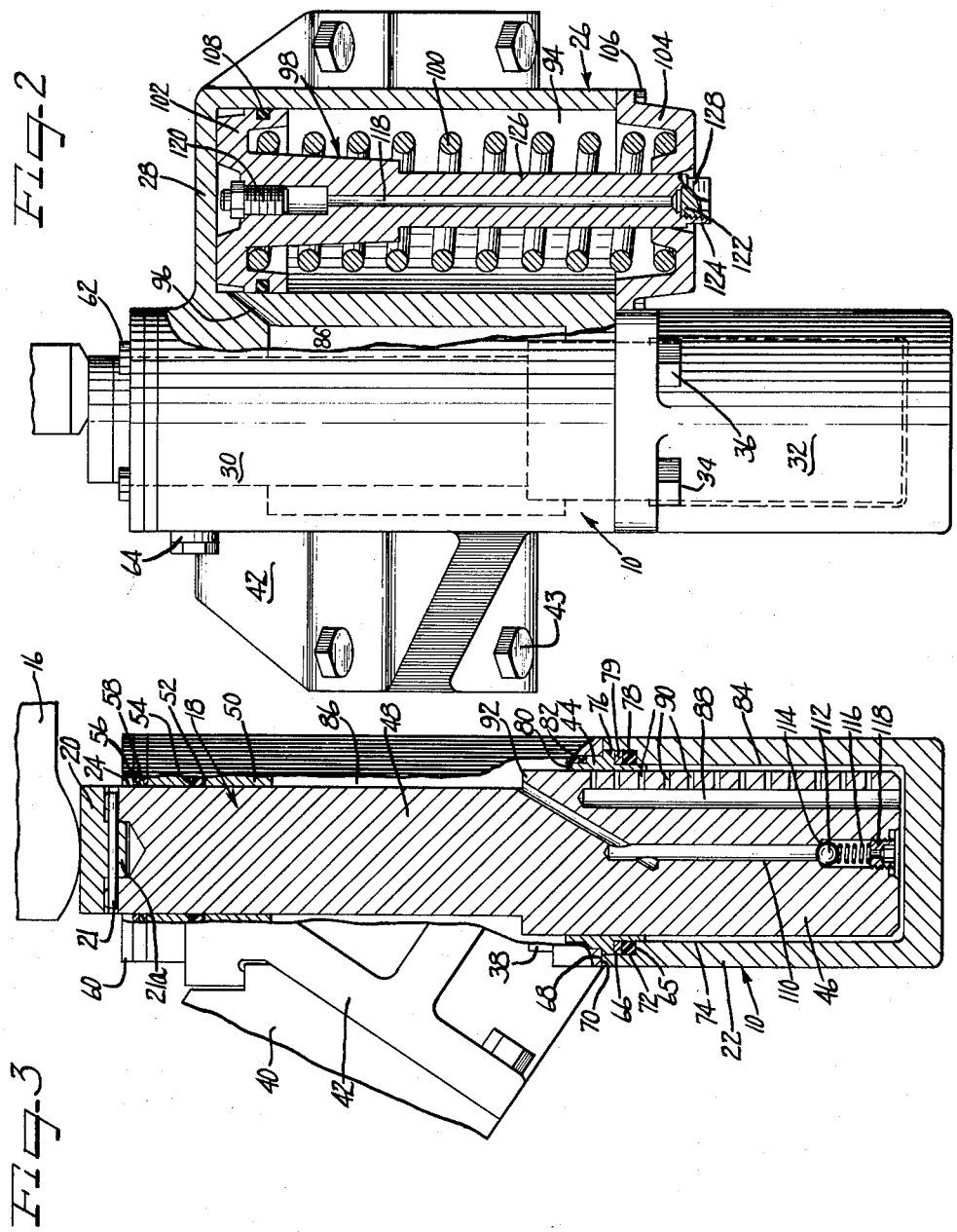

Nov. 7, 1961 R. D. RUMSEY 3,007,551
ENERGY ABSORBING DEVICE
Filed March 17, 1958 3 Sheets-Sheet 3
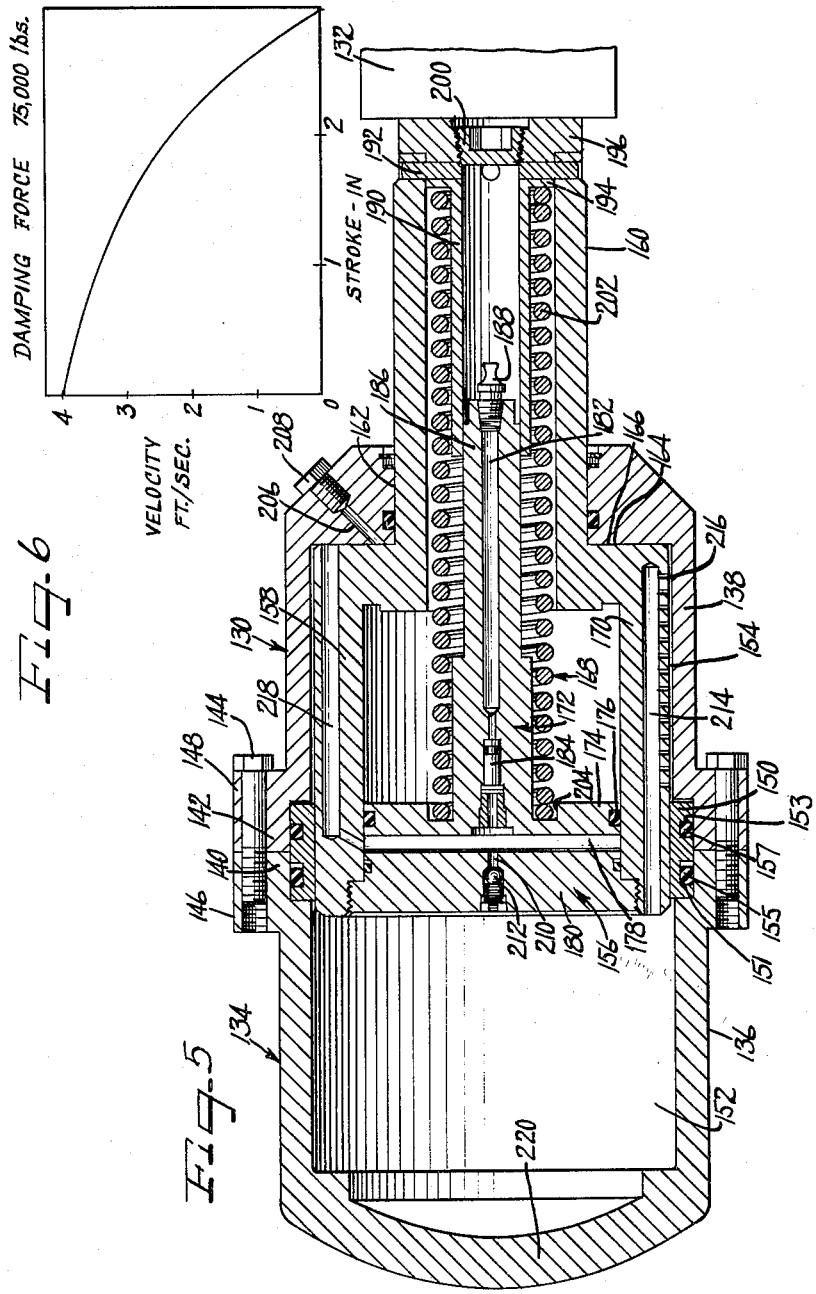
Inventor
Rollin Douglas Rumsey
by Hill, Sherman, Meroni, Gross & Simpson Attys

3,007,551
ENERGY ABSORBING DEVICE
Rollin Douglas Rumsey, Buffalo, N.Y., assignor to Houdaille Industries, Inc., Buffalo, N.Y., a corporation of Michigan
Filed Mar. 17, 1958, Ser. No. 721,870
16 Claims. (Cl. 188—96)

This invention relates to shock absorbers, and more particularly to a hydraulic shock absorber having a piston metering valve which will damp a load at a uniform rate so as to protect a radar antenna from shock damage in the event of a hard over electrical control signal caused by battle damage or electrical failure or to permit lowering a missile unit to a ship's deck by a conventional hoist without damage, the shock absorber having a replenishing means which will reset the piston and indicate the level of fluid in the system.

Various types of shock absorbers and damping systems are available for accommodating heavy loads, such as the rotary vane shock absorbers used in railroad cars and the like, but these are inadequate for damping loads from the sensitive equipment referred to because their moving mechanical parts could jam or otherwise become ineffective. The present invention overcomes this difficulty by means of a shock absorber which comprises a piston slidably received in a hydraulic cylinder and defining a plurality of axially spaced orifices which move past a bearing intermediate the ends of the cylinder when the piston is moved into the cylinder so as to permit displacement of the fluid at a rate which decreases uniformly. The piston is urged to a rest position in the cylinder by a spring loaded replenishing system, and the size and spacing of the orifices is calibrated so that when the piston is moved from the rest position by a load of known mass and velocity, the incremental increase in resistance to displacement of fluid through the orifices will be such as to brake the load at a fixed rate of deceleration. The replenishing system includes a piston which is adapted to retract under pressure from the load so as to accumulate the energy needed to return the first piston to its rest position, and for this purpose, a check valve is defined in the first piston which affords a quick return of the fluid in response to the accumulated energy of the second piston, which is effective to reset the first piston.

When the fluid in the system has been depleted to an undesirable extent, this fact will immediately be evident because the piston of the replenishing system automatically provides a level gauge. Replenishing fluid can be introduced directly through the said replenishing piston, and in one embodiment of the invention, the replenishing system is disposed coaxially within the first piston.

Accordingly, it is an object of the present invention to provide a shock absorber adapted to afford uniform deceleration for predetermined loads by means of a piston having a plurality of axially spaced metering orifices controlling the rate of fluid displacement as the piston is moved into the cylinder therefor by a load thereagainst, the size and spacing of the apertures being calibrated in accordance with the load to provide a uniform deceleration of the load.

Another object is to provide a shock absorber and damping system as described in which the piston defines a passage having a check valve effective to prevent fluid from flowing counter to the movement of the piston when a load is imposed on the piston and a replenishing system having an accumulator adapted to return fluid quickly through said passage and check valve after it has been metered through the orifices in the piston whereby to reset the piston.

Another object of the invention is to provide a replenishing system for the shock absorber as described having a piston and resilient means for storing energy from a load during deceleration thereof, the resilient means having a strength sufficient to return said piston to an initial position for maintaining a predetermined hydraulic pressure for the shock absorber.

Another object of the invention is to provide a replenishing system as described in which the axial position of the piston is effective to indicate the level of fluid therein.

Another object of the invention is to provide a replenishing system as described in which the piston defines an axial bore and check valve means are disposed in the bore to admit replenishing fluid into the system in accordance with the requirements indicated by the axial position of the piston.

Yet another object of the invention is to provide a replenishing system which, in one embodiment of the invention, is received in the piston of the shock absorber cylinder and coacts therewith to maintain the desired pressure thereagainst and to reset the piston after its damping action.

Another object is to provide a shock absorber of extremely simple and efficient construction, which may be readily assembled and which requires a minimum of moving parts.

Other advantages of the invention will become apparent as the description proceeds in accordance with the drawings, in which:

FIGURE 1 is a front elevational view of the shock absorber of the invention in combination with a radar antenna;

FIGURE 2 is an enlarged elevation, partly in section, of the shock absorber of the system;

FIGURE 3 is a vertical sectional view of the shock absorber of FIGURE 2;

FIGURE 4 is a graph showing the damping action of the shock absorber of FIGS. 1–3;

FIGURE 5 is a vertical sectional view of a second embodiment of the invention in combination with a diagrammatic representation of a magazine hoist for missiles and the like; and FIGURE 6 is a graph showing the damping action of the shock absorber of FIG. 5.

Referring now to FIGURES 1 through 3 a pair of shock absorbers 10 and 12 according to the invention are shown in assembled relationship with a radar antenna 14. The shock absorbers 10 and 12 are adapted to stabilize the antenna assembly 14 against shock caused by a hard over electrical control signal, battle damage or the like transmitted by means of impact with respect to an anvil 16 on a reflector 17. As seen in FIGURES 2 and 3 by reference to the shock absorber 10, each of the shock absorbers 10 and 12 comprises a piston 18 having a striker pad 20, shown in load-bearing engagement with the anvil or load imparting means 16 and secured to the piston by pin means 21 extending through the end of the piston and depending boss 21a, a cylinder 22 having an open end 24 and slidably receiving the piston 18 and a replenishing system 26 whose casing 28 is formed integrally with a cup-shaped upper portion 30 of the cylinder. The upper cylinder portion 30 is held in abutting relation to a complementary lower cylinder portion 32 by means of bolts such as the bolts 34, 36 and 38, as hereinafter further described, and is mounted on the base 40 of the antenna 14 by means of a flange 42 formed integrally therewith having a plurality of bolts 43 secured in the base.

A bearing 44 is disposed in the cylinder 22 intermediate the ends thereof and is adapted to slidably receive a relatively large inner end portion 46 of the piston 18, the outer portion 48 of the piston being of relatively reduced diameter and extending through the open end 24 of the cylinder 22 in sealing relationship with a bearing 50. This sealing relationship is assured by an O-ring 52 received within an annular recess 54 of the bearing 50. A rod scraper or bushing 56 and felt pad 58 are held in position on the bearing 50 by an annular cap 60 which is secured by bolts 62 to the upper portion 30 of the cylinder. The bearing 50 defines a bleed hole (not shown) provided with a bleed plug 64 for bleeding off hydraulic fluid for use in the shock absorber as hereinafter set forth.

In order to secure the bearing 44 in position, the lower cylinder portion 32 is formed with an internal shoulder 65 so that the portions 30 and 32 together define a recess 66, the ends 68 and 70 of the portions 30 and 32 being held in abutting relationship by the bolts 34, 36 and 38 and the lower portion 32 defining an end portion 72 of somewhat larger diameter than the main bore 74 thereof. The bearing 44 has a radial flange 76 of smaller width than the recess 66, and resilient means 78 are disposed in the recess against a back up ring 79 and in sealing relationship to the end portion 72. The bearing 44 is cut away at 80 to receive resilient sealing means 82, which cooperates with the bearing and the means 78 and 79 in sealing the joint between the ends 68 and 70 thereof.

It will be seen that the bearing 44 cooperates with the piston 18 to divide the cylinder 22 into two compartments 84 and 86. In order to provide an incrementally increasing damping resistance which produces a uniform rate of deceleration in a load of known mass and velocity, a cylindrical axially extending passage 88 is defined in the piston 18 and a plurality of radially extending orifices 90 are formed in predetermined, axially spaced relationship along the passage 88. The replenishing system 26 biases the piston 18 to a rest position in the compartment 86 defined by a shoulder 92 of the piston which extends between the portions 46 and 48 thereof, as hereinafter further described, and the orifices 90 are disposed within the compartment 86 in this position of the piston so that each of them affords communication between the compartments 84 and 86. As load from the anvil 16 moves the piston 18 downwardly toward the compartment 84, the orifices 90 are moved past the bearing 44 so that they are successively sealed from the compartment 86. The diameters of the orifices and their spacing from one another are calibrated so that the rate of deceleration of an expected load is uniform, as stated, and the travel of the piston is such as to bring the load to a stop at or before the time the orifices have all moved past the bearing 44. Thus the rate of flow of fluid through the orifices 90 is incrementally diminished and the damping resistance is increased as shown in FIGURE 4, in which a damping force of 13,000 pounds is obtained at the completion of the instroke.

The amount of fluid displaced from compartment 84 to compartment 86 during the instroke of the piston 18 may be slightly greater than the increased capacity of the compartment 86 afforded by the reduced diameter of the portion 48 of the piston introduced into the compartment 86. The excess fluid thus produced is accumulated by the replenishing system 26, whose casing 28 is open ended and defines a bore 94 communicating with the compartment 86 by means of a port or conduit 96. A piston 98 is slidably received in the bore 94 and is urged toward the port 96 by a helical spring 100 which bears against the head 102 of the piston at one end and against a wall 104 at the other end which is secured to the casing 28 by bolts such as the bolts 106. The piston head 102 has an O-ring 108 therein, and on completion of the in stroke of the piston 18, the piston 98 and spring 100 provide a pressure differential between the interior and exterior portions of the damper.

It is desirable to provide a quick-return action for the piston 18, in the event of a quick succession of shocks thereagainst, and for this purpose the piston defines a passage 110 which extends through the enlarged portion 46 of the piston to the reduced portion 48 immediately above the shoulder 92 so that it affords communication between the compartments 84 and 86. So that the orifices 90 will provide a constant metering valve, the passage 110 is closed to the flow of fluid from compartment 84 to compartment 86 by a ball check valve 112 which is biased against a seat 114 in the passage 110 by a spring 116 which is held in position by a disc 118 in the passage. The spring 116, however, readily permits flow of fluid in the opposite direction as urged by the piston 98, to equalize the pressure in the compartments 84 and 86 and reset the piston as stated.

During extended use, some leakage may be produced in the system 10 so that replenishing is required. Also, it may be desirable to adjust the amount of pressure in the system. In accordance with the invention, fluid is introduced in the system 10 for these purposes by providing a coaxial bore 118 in the piston 98, a fill check valve and filter 120 being disposed in an enlarged inner portion of the bore 118 and a fill fitting 122 in the outer end thereof. The amount of pressure and fluid in the system 10 is automatically indicated by the position of the outer end 124 of the piston 98, relative to the end wall 104. As the spring 100 is compressed by hydraulic fluid during the instroke of the piston 18, the piston moves to its fully extended position, which may be shown by indicia 126. However, the end 124 will normally extend outwardly of the wall 104 by a predetermined extent when a suitable amount of fluid is in the system, and replenishing is indicated directly when the end 124 is adjacent the wall 104 as shown. This may be indicated by suitable indicia 128.

Referring now to FIGURE 5, another embodiment of the shock absorber of the invention is shown and designated by reference numeral 130, adapted for use with a magazine hoist, which is shown in schematic form and indicated by numeral 132. The hoist 132 is used for lowering guided missiles to the deck of a battle ship, for example, so that the shock absorber 130 must provide an extremely uniform rate of deceleration for the heavy loads imposed thereon. This relationship is seen particularly by reference to FIGURE 6.

The shock absorber 130 comprises a cylinder 134 including two cup-shaped portions 136 and 138 whose ends 140 and 142 provide abutment shoulders which are joined by bolts 144 received in opposed radial flanges 146 and 148. Each of the portions 136 and 138 is recessed adjacent the shoulders 140 and 142 to receive a bearing 150 in snug engagement therein, which divides the cylinder 134 into two compartments 152 and 154. The bearing 150 defines annular grooves 151 and 153 which receive O-rings 155 and 157 on either side of the ends 140 and 142 which cooperate with the bearing to seal the joint between the said ends. A piston 156 has an inner end 158 of relatively large diameter slidably received in the bearing 150, the reduced outer end 160 thereof extending through an opening 162 in the portion 138. A shoulder 164 extends between the ends 158 and 160 of the piston 156, and serves as a stop means when urged against the end wall 166 of the portion 138 by a replenishing and accumulator system 168 which is deposed within a bore 170 in the piston 156. The replenishing system 168 is thus protected to an unusual degree and affords an especially compact construction, and comprises a piston 172 having a head portion 174 slidably received in the bore 170 and sealed by an O-ring 176 so as to maintain fluid in a chamber 178 between the head portion 174 and the face 180 of the piston 156. In order to permit replenishing fluid to be introduced into the chamber 178, the piston 172 defines an axial bore 182, the head 174 of the piston having a check valve and filter 184 therein for this purpose. The reduced outer end 186 of the piston is provided with a fluid fill fitting 188 and is slidably received in a sleeve 190 disposed coaxially and in radially spaced relation within the bore 170. The sleeve 190 is held in piston 156 by means of a plurality of dowels 192 driven in radially spaced increments around the reduced portion 160 of the piston and the base 194 of the sleeve. A striker pad 196 is formed on the base 194 and defines an opening 198 therewith for receiving a removable plug 200 to afford access to the fill fitting 188 as desired. The piston 172 is biased toward the wall or face 180 of the piston 156 by means of a helical spring 202 bearing against the base 194 at its upper end and received within an annular recess 204 in the head 174 at its upper end. As in the previous embodiment, the axial position of the piston 172 provides an indication of the fluid level in the system, and upon removal of the plug 200, adjustment and replenishing of the fluid level in the system may be readily made. Thus, it will be seen that fluid may also be withdrawn through the orifice 206 by removal of the bleed plug 208.

The face or wall 180 of the piston 156 provides a passage 210 having a check valve 212 for admitting fluid from the chamber 178 into the compartment 152, and preventing flow in the opposite direction, and the piston 172 thus maintains an even pressure in the cylinder 134 and biases the piston 156 into an initial position in the compartment 154 as shown and herein after further described. In order to afford incrementally increasing resistance to a load on the piston 156 which would tend to move it into the cylinder 134, the piston defines an axial, cylindrical passage 214 having a plurality of orifices 216 disposed therealong in predetermined axially spaced relation, each having a diameter such as to provide a substantially uniform deceleration for the load. The orifices 216 are formed so that when the piston 156 is in its initial or rest position, they will each be disposed within the compartment 154 and communicate through the passage 214 with the compartment 152. As the piston 156 is pushed into the cylinder, the orifices will be successively sealed from the compartment 154, thereby reducing the area of flow and effecting the damping action seen in FIGURE 6. As the fluid flows from the compartment 152 into the compartment 154 during such action an excess portion thereof will flow through a second passage 218 and into the chamber 178 to the extent that the reduced piston portion 160 occupies equivalent space in the compartment 154. Therefore, the piston 172 will be moved outwardly and sufficient energy stored in the spring 202 to reset the piston 156 upon completion of its instroke. Thus, fluid will then be urged through the passage 210 and check valve 212 to provide additional fluid in the compartment 152 which will move the piston 156 to its original position as shown.

The construction of the entire cylinder 134 is exceptionally sturdy, as seen for example with respect to the dished end wall 220 of the cylinder portion 136. The abutting engagement of the shoulders 140 and 142 of the portions 136 and 138 assures that axial stress will be received directly along the cylindrical wall of the cylinder 134, and the pressure between the shoulders during damping action prevents leakage, in cooperation with the O-rings 222 and 224 in the bearing 150.

There has thus been provided a shock absorber which is of simple but rugged construction, and which is adapted to decelerate loads of great force without any variation in rate such as might be produced by rotary vane decelerators or the like. The basic rate of deceleration is fixed by the spacing and diameter of the orifices in the piston which receives the load, so that continued use will not change the metering effect. Nevertheless, the replenishing system of the invention affords some degree of adjustment as desired. The fact that the replenishing system can be utilized by refilling directly through the piston thereof provides great advantages in ease of filling and simplicity. And since the piston itself can serve as an automatic indicator of the level in the system, there is no need for the complex pressure responsive means heretofore in use.

Although I have herein set forth and described my invention with respect to specific principles and details thereof it will be understood by those skilled in the art that these may be varied without departing from the spirit and scope of the invention as set forth in the hereunto appended claims.

I claim as my invention:

1. A shock absorber comprising a cylinder, a bearing in said cylinder dividing said cylinder into two compartments and a piston slidably received in said bearing and biased toward one of said compartments, said piston defining a plurality of axially spaced orifices positioned to afford communication between said compartments when said piston is in a rest position and adapted to be successively sealed from communication with said one compartment by said bearing when said piston is moved toward said other compartment.

2. An energy absorbing system comprising a cylinder and a supply of hydraulic fluid for said cylinder, a bearing dividing said cylinder into two compartments, a piston slidably received in said bearing biased toward one of said compartments, said piston defining a plurality of axially spaced orifices communicating with both of said compartments when said piston is in a rest position thereof and adapted to be successively disposed on a side of said bearing opposite said one compartment and in the other of said compartments when said piston is moved toward the other of said compartments, said piston defining a passage extending therethrough and having a check valve in said passage, said passage being open to flow from said one compartment to said other compartment and closed to flow from said other compartment to said one compartment in each position of said piston.

3. A shock absorber comprising a cylinder open at one end thereof, a piston slidably extending through the open end of said cylinder for receiving a load thereagainst, said piston being biased toward said open end and having stop means for limiting axial movement toward said open end, and a bearing in said cylinder slidably receiving said piston and dividing said cylinder into two compartments, said piston defining a plurality of axially spaced orifices disposed in the compartment adjacent the open end of said cylinder and communicating with both said compartments when said piston is in a rest position defined by said stop means and moving successively out of said compartment past said bearing when said piston is moved away from said open end in response to a load thereagainst, whereby to afford incrementally increasing resistance to the load.

4. A shock absorber comprising a cylinder having a bearing disposed intermediate the ends thereof, a piston slidably received in said bearing and defining a passage opening to one end of said piston and having a plurality of orifices of predetermined diameter opening in predetermined axially spaced relation along the side of said piston and means urging said piston toward a rest position in said cylinder, said orifices being disposed on one side of said bearing when said piston is in its rest position and moving successively past said bearing when said piston is moved toward the other side of said bearing to increase fluid resistance to said movement of the piston at a uniform rate.

5. In a shock absorber for decelerating loads at an even rate, a cylinder, a piston for said cylinder, a bearing intermediate the ends of said cylinder slidably receiving said piston and an accumulator biasing said piston toward one end of said cylinder, said piston having a plurality of axially spaced orifices disposed on the side of said bearing adjacent said one end when the piston is in a rest position thereof and adapted to be successively sealed from the portion of said cylinder on said one side of said bearing when said piston is moved toward the other side of said bearing.

6. An energy absorbing system comprising a cylinder open at one end, a bearing in said cylinder disposed in predetermined axially spaced relation to said one end, a piston slidably received in said bearing and extending through said open end, and means for providing a supply of hydraulic fluid for said cylinder including accumulator means adapted to urge said piston toward said one end of said cylinder, said piston having a passage therethrough and a check valve disposed in said passage adapted to prevent flow toward said one end through said passage, said piston defining a plurality of axially spaced orifices communicating with the cylinder on each side of said bearing when said piston is in a rest position and adapted to be successively sealed from the portion of said cylinder adjacent said one end when said piston is moved toward the other end of said cylinder.

7. An energy absorbing system comprising a cylinder having an open end, a bearing intermediate the ends of said cylinder, a piston slidably received in said bearing and having a reduced portion extending through said open end, and a replenishing system for maintaining a constant supply of hydraulic fluid in said cylinder including a casing defining an axial bore and a port communicating with the other end of said cylinder, a piston slidably received in said casing, resilient means urging said piston toward said port and inlet means for admitting additional hydraulic fluid into said casing, said first piston having a passage communicating with the cylinder on both sides of said bearing, a check valve being disposed in said passage to afford passage of fluid from the portion of said cylinder adjacent said open end to the portion on the other side of said bearing, and to prevent fluid flow in the other direction through said passage, said first piston defining a plurality of orifices disposed in predetermined axially spaced relationship and communicating with both sides of said cylinder when said piston is urged by said replenishing system to a rest position in the portion of said cylinder adjacent said open end, said bearing cooperating with said piston to incrementally seal said apertures from the side of said cylinder adjacent said open end and to provide a predetermined rate of deceleration for a load on the reduced end of said piston.

8. An energy absorbing system comprising a cylinder having an open end, a bearing in said cylinder in predetermined axially spaced relation to said open end, a piston slidably received in said bearing and having a reduced end portion extending through said open end, said piston defining an axial passage communicating with the other end of said cylinder having a plurality of axially spaced orifices, a bore having a relatively reduced diameter at the reduced end portion of said piston and a passage communicating with the other end of said cylinder and with said bore, said piston also defining a passage communicating with said bore and with a portion of said cylinder adjacent the open end receiving said piston, a supply of hydraulic fluid in said cylinder, a piston in said bore, resilient means urging said piston toward the other end of said cylinder and check valve means in said second passage preventing the fluid from flowing from the other end of said cylinder into said bore, said resilient means biasing said first piston toward said open end of said cylinder, said orifices being disposed between said bearing and said open end when said first piston is at a rest position and being successively sealed from the portion of said cylinder between said bearing and said open end when said first piston is moved toward the other end whereby to decelerate loads against the reduced end of said first piston at a rate determined by said orifices.

9. An energy absorbing system comprising a cylinder open at one end, a bearing in said cylinder in predetermined spaced relationship to said open end and dividing said cylinder into two compartments, a piston slidably received in said bearing and having a reduced end portion extending through said open end of said cylinder, said piston defining a bore having a portion of reduced diameter extending through said reduced end portion, said bore communicating with the other end of said cylinder, a check valve in said piston permitting fluid to flow from said bore to said other end of said cylinder, said piston defining an axial passage extending from the compartment adjacent said open end of said cylinder and opening into said bore at its inner end and a passage extending from the other compartment and having a plurality of axially spaced apertures, a second piston slidably received in the first piston having an axial bore therethrough and a check valve in said bore permitting fluid to move into the first bore and resilient means biasing said second piston inwardly from the open end of said cylinder whereby to bias the first piston toward the open end of said cylinder.

10. In combination with a radar antenna means having load imparting means responsive to loads on the antenna means, an energy absorbing system adapted to decelerate the movement of the load imparting means at a uniform rate comprising a cylinder open at one end, a bearing dividing said cylinder into two compartments, a piston slidably received in said bearing and extending through said open end, said piston defining a plurality of orifices disposed in predetermined axial relation in said piston and accumulator means urging said piston toward said open end, said orifices communicating with both said compartments when said piston is in a rest position, said load imparting means being in engagement with the outer end of said piston, said orifices being adapted to be successively sealed by said bearing in response to load on said piston from said load imparting means and dimensioned to produce uniform incremental deceleration of said load imparting means.

11. In combination with a radar antenna means having load imparting means responsive to loads on the antenna means, a damper comprising a cylinder open at one end, a bearing in said cylinder in predetermined spaced relation to said end, and dividing the cylinder into two compartments, a piston slidably received in said bearing and having an end extending through said open end of said cylinder in engagement with said load imparting means, said piston defining a plurality of axially spaced orifices, a passage communicating with each of said compartments and having a check valve permitting fluid to flow from the compartment adjacent said open end of the cylinder into the other compartment, a casing on said cylinder defining a bore and a port communicating with said other compartment at one end thereof, a piston slidable received in said bore, resilient means biasing said piston toward said port and a supply of hydraulic fluid in said casing and said cylinder, said orifices being disposed in said first compartment in a rest position of said piston and in communication with the other of said compartments, and each having a diameter such as to afford a uniform deceleration of a load placed on said piston by said load imparting means.

12. In combination with a magazine hoist, a damper for said hoist comprising a cylinder having an open end, a bearing dividing said cylinder into two compartments, a piston slidably received in said bearing and a reduced end portion extending through said open end in load bearing relationship to the hoist, said piston defining a bore having a portion of reduced diameter extending through said reduced end portion, said bore communicating with the other end of said cylinder, a check valve in said piston permitting fluid to flow from said bore to said other end of said cylinder, said piston defining an axial passage extending from the compartment adjacent said open end of said cylinder and opening into said bore at its inner end and a passage extending from the other compartment and having a plurality of axially spaced apertures, a second piston slidably received in the first piston having an axial bore therethrough and a check valve in said bore permitting fluid to move into the first bore and resilient means biasing said second piston inwardly from the open end of said cylinder whereby to bias the first piston toward the open end of said cylinder.

13. In an energy absorbing system, a cylinder including two parts each having an abutment shoulder adapted to engage the abutment shoulder of the other part, said parts cooperating to define a recess, a bearing in said cylinder snugly engaged in said recess, means securing said parts with the shoulders thereof in abutting relation to hold said bearing in said recess, said bearing dividing said cylinder into two compartments, a piston slidably received in said bearing and defining a plurality of axially spaced orifices, means urging said piston toward one of said compartments, said orifices being disposed in said compartment and communicating with both said compartments in a rest position of said piston and adapted to be successively sealed from said compartment when said piston is moved toward said other compartment.

14. In combination with a shock sensitive load receiving unit having load imparting means, a shock absorber comprising a cylinder, a bearing in said cylinder dividing said cylinder into two compartments and a piston slidably received in said bearing and biased toward one of said compartments, said piston defining a plurality of axially spaced orifices affording communication between said compartments when said piston is in a rest position and adapted to be successively sealed from communication with said one compartment by said bearing when said piston is moved toward said other compartment, said load imparting means being adapted to move said piston toward said other compartment in response to loads on said shock sensitive load receiving unit.

15. An energy absorbing system comprising a hollow cylinder, bearing means in said cylinder defining first and second compartments, a piston slidably received in said bearing means, conduit means in said piston, and port means in said piston communicating with said conduit means and said second compartment to a maximum extent when said piston is in one position and to a gradually reducing extent when said piston is moved toward said second compartment by movement of said port means over said bearing means.

16. An energy absorbing system comprising a hollow cylinder, bearing means in said cylinder defining first and second compartments, a piston slidably received in said bearing means, conduit means in said piston, port means in said piston communicating with said conduit means and said second compartment to a maximum extent when said piston is in one position and to a gradually reducing extent when said piston is moved toward said second compartment by movement of said port means over said bearing means and means urging said piston toward said first compartment.

References Cited in the file of this patent

UNITED STATES PATENTS

| | | |
|---|---|---|
| 1,570,479 | Goldensky et al. | Jan. 19, 1926 |
| 1,918,698 | Gruss | July 18, 1933 |
| 2,333,096 | Dowty | Nov. 2, 1943 |
| 2,559,047 | Porter et al. | July 3, 1951 |
| 2,811,227 | O'Connor | Oct. 29, 1957 |
| 2,909,248 | Gies | Oct. 20, 1959 |
| 2,922,496 | Schultz | Jan. 26, 1960 |

FOREIGN PATENTS

| | | |
|---|---|---|
| 249,928 | Great Britain | Apr. 6, 1926 |
| 471,157 | Italy | May 7, 1952 |